US009916494B2

(12) United States Patent
Zou et al.

(10) Patent No.: US 9,916,494 B2
(45) Date of Patent: Mar. 13, 2018

(54) POSITIONING FEATURE POINTS OF HUMAN FACE EDGE

(71) Applicant: Alibaba Group Holding Limited, Grand Cayman (KY)

(72) Inventors: Jianfa Zou, Hangzhou (CN); Ying Huang, Hangzhou (CN); Yan Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/080,125

(22) Filed: Mar. 24, 2016

(65) Prior Publication Data
US 2016/0283780 A1    Sep. 29, 2016

(30) Foreign Application Priority Data

Mar. 25, 2015    (CN) .......................... 2015 1 0134068

(51) Int. Cl.
| | |
|---|---|
| *G06T 7/00* | (2017.01) |
| *G06K 9/00* | (2006.01) |
| *G06T 7/12* | (2017.01) |
| *G06T 7/149* | (2017.01) |

(Continued)

(52) U.S. Cl.
CPC ....... *G06K 9/00281* (2013.01); *G06K 9/6207* (2013.01); *G06T 7/12* (2017.01); *G06T 7/149* (2017.01); *G06K 9/4642* (2013.01); *G06K 9/4652* (2013.01); *G06T 2207/30201* (2013.01)

(58) Field of Classification Search
CPC combination set(s) only.
See application file for complete search history.

(56) References Cited

U.S. PATENT DOCUMENTS

| | | | |
|---|---|---|---|
| 2002/0126893 A1 | 9/2002 | Held et al. | |
| 2005/0044056 A1* | 2/2005 | Ray ................... | G06K 9/00288 706/52 |
| 2005/0063582 A1 | 3/2005 | Park et al. | |

(Continued)

OTHER PUBLICATIONS

Guan, et al., "3D Face Recognition Based on Facial Structural Angle and Local Region Map", 2008 IEEE International Conference on Multimedia and Expo, Apr. 26, 2008, retrieved from http://cs.brown.edu/~pguan/publications/3D%20face %20recognition%20based%20on%20Facial%20SStructural %20Angel%20and%20Local%20Region%20Map.pdf.

(Continued)

*Primary Examiner* — Jerome Grant, II
(74) *Attorney, Agent, or Firm* — Lee & Hayes, PLLC

(57) ABSTRACT

An example method for positioning feature points of a human face edge including fitting a profile edge curve of a human face edge in a human face image according to the human face image; calculating by using a preset human face edge feature point calculation model to obtain feature points of the human face edge in the human face image; calculating by using a preset convergence algorithm to obtain feature information of a convergence feature point corresponding to each feature point; determining respectively whether a distance from each feature point to the profile edge curve is greater than a distance from a respective corresponding convergence feature point to the profile edge curve; and determining whether a magnitude of overall position change of all the feature points of the human face edge in the human face image before and after the above determination is less than a preset threshold.

20 Claims, 12 Drawing Sheets

(51) Int. Cl.
*G06K 9/62* (2006.01)
*G06K 9/46* (2006.01)

(56) References Cited

U.S. PATENT DOCUMENTS

| | | | |
|---|---|---|---|
| 2005/0286799 A1* | 12/2005 | Huang | G06T 11/00 |
| | | | 382/275 |
| 2006/0010582 A1 | 1/2006 | Nagahashi et al. | |
| 2006/0045382 A1 | 3/2006 | Adachi et al. | |
| 2006/0067573 A1* | 3/2006 | Parr | G06K 9/00275 |
| | | | 382/154 |
| 2006/0267978 A1* | 11/2006 | Litke | G06T 17/30 |
| | | | 345/419 |
| 2007/0031028 A1* | 2/2007 | Vetter | G06K 9/00208 |
| | | | 382/154 |
| 2007/0217683 A1 | 9/2007 | Kinoshita | |
| 2007/0269111 A1* | 11/2007 | Bolin | G06K 9/00281 |
| | | | 382/195 |
| 2008/0063263 A1* | 3/2008 | Zhang | G06K 9/00234 |
| | | | 382/159 |
| 2008/0298643 A1 | 12/2008 | Lawther | |
| 2009/0116749 A1* | 5/2009 | Cristinacce | G06K 9/621 |
| | | | 382/195 |
| 2009/0169066 A1 | 7/2009 | Yang et al. | |
| 2009/0309878 A1* | 12/2009 | Otani | G06K 9/00208 |
| | | | 345/427 |
| 2013/0044958 A1* | 2/2013 | Brandt | G06K 9/00248 |
| | | | 382/201 |
| 2013/0124514 A1 | 5/2013 | Datta et al. | |
| 2013/0300900 A1 | 11/2013 | Pfister et al. | |
| 2014/0099031 A1* | 4/2014 | Brandt | G06K 9/00228 |
| | | | 382/201 |
| 2014/0147003 A1* | 5/2014 | Li | G06K 9/00234 |
| | | | 382/103 |
| 2014/0193035 A1* | 7/2014 | Ryu | G06T 7/2046 |
| | | | 382/103 |
| 2016/0042224 A1* | 2/2016 | Liu | G06K 9/00248 |
| | | | 382/203 |
| 2016/0283780 A1* | 9/2016 | Zou | G06K 9/00268 |

OTHER PUBLICATIONS

Park, et al., "Image-Based 3D Face Modeling System", EURASIP Journal on Advances in Signal Processing, Aug. 15, 2005, retrieved from http://pdfs.semanticscholar.org/3f2d/903d2702bf16505f2d8488c0f31fbda115.pdf.

The PCT Search Report and Written Opinion dated May 27, 2016 for PCT application No. PCT/US2016/024009, 15 pages.

* cited by examiner

POSITIONING FEATURE POINTS OF HUMAN FACE EDGE

CROSS REFERENCE TO RELATED APPLICATION

The present disclosure claims the benefit of Chinese Patent Application Number 201510134068.3 filed Mar. 25, 2015, entitled "METHOD AND APPARATUS FOR LOCATING CHARACTERISTIC POINTS OF FACIAL EDGE" which is hereby incorporated by reference in its entirety.

TECHNICAL FIELD

The present disclosure relates to the field of image processing technologies, and, more particularly, to a method for positioning feature points of a human face edge. The present disclosure also relates to an apparatus for positioning feature points of a human face edge.

BACKGROUND

In the field of human-computer interaction technologies, a human face provides a lot of very valuable information such as skin color, profile, and expression. Especially, in recent years, positioning technologies of feature points of a human face have rapidly developed, and are widely applied in various technical fields such as identity recognition, human face three-dimensional reconstruction, human face beautification, posture estimation, and human face tracking. The positioning technology of feature points of a human face refers to detecting a human face based on a detection technology of a human face, and performing precise calculation on position information and shape information of feature points of the detected human face. Precise positioning of the feature points of human face edge determines the shape of the human face.

Currently disclosed methods for positioning feature points of a human face are mainly methods for positioning feature points of a human face based on ASM (Active Shape Model), AAM (Active Appearance Model), and SDM (Supervised Descent Method) algorithms. The ASM algorithm positions feature points of a human face based on a shape statistic model. For example, a shape such as a human face profile may be expressed by sequentially connecting coordinates of several key feature points in series to form a shape vector. The AAM algorithm further performs, on the basis of the ASM algorithm, statistical modeling on texture (a shape-unrelated image obtained by deforming a human face image into an average shape), and merges the two statistical models, namely, the shape statistical model and the texture statistical model, into an appearance model. The SDM algorithm extracts, according to initial positions of the feature points of a human face, each non-linear SIFT (Scale Invariant Feature Transform) feature using a feature point as the center, and then solves an NLS (Non-linear Least Squares) problem between the feature point and the corresponding SIFT feature, thereby implementing positioning of the feature points of a human face.

The methods for positioning feature points of a human face provided in the above conventional techniques have apparent defects.

The methods for positioning feature points of a human face provided in the conventional techniques have the following defects: in the above method for positioning feature points of a human face based on the SDM algorithm, in the process of positioning the feature points of a human face, the feature points of the human face need to be extracted for converging iteration. However, when the human face in a human face image is in different backgrounds, it is very difficult to extract the feature points of the human face, especially when the human face in a human face image is in a complicated background, it is difficult to determine accurate positions of the feature points of the human face, and therefore, the accuracy of the feature points of the human face determined in this method is low.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method for positioning feature points of human face edge to solve the problems of positioning difficulty and feature point positioning inaccuracy in the conventional method for positioning feature points of a human face. The present disclosure also provides an apparatus for positioning feature points of human face edge.

The present disclosure provides a method for positioning feature points of human face edge, including:

fitting a profile edge curve of human face edge in a human face image according to the human face image and calculating by using a preset human face edge feature point calculation model to obtain feature points of the human face edge in the human face image, and acquiring feature information of each feature point, wherein the feature information includes at least position information;

calculating by using a preset convergence algorithm to obtain feature information of a convergence feature point corresponding to each feature point according to the feature information of each feature point;

determining respectively whether a distance from each feature point to the profile edge curve is greater than a distance from a respective corresponding convergence feature point to the profile edge curve according to feature information of each feature point and each convergence feature point;

if a result is positive, acquiring the feature information of the convergence feature point corresponding to the feature point to serve as the feature information of the feature point;

if a result is negative, keeping the feature information of the feature point unchanged;

determining whether a magnitude of overall position change of all the feature points of the human face edge in the human face image before and after the above determination is less than a preset threshold;

if the magnitude is less than the preset threshold, positioning position information of the group of feature points as qualified feature points of human face edge; and if the magnitude is not less than the preset threshold, returning to the step of calculating by using a preset convergence algorithm to obtain feature information of a convergence feature point corresponding to each feature point according to the feature information of each feature point.

Optionally, before the step of fitting a profile edge curve of human face edge in a human face image according to the human face image, the method includes:

acquiring a human face image of a human face; and separating skin color regions and non-skin color regions in the human face image by using a preset skin color model, and filtering out the non-skin color regions in the human face image.

Optionally, after the step of acquiring a human face image of a human face, the method includes:

expanding or clipping the acquired human face image into a human face image having a set size and/or format.

Optionally, the skin color model includes a Gaussian mixture model (GMM).

Optionally, the step of fitting a profile edge curve of human face edge in a human face image according to the human face image includes:

detecting strong edge of a human face in the human face image; and fitting a profile edge curve of human face edge in the human face image according to the detected strong edge of the human face in the human face image.

Optionally, the strong edge of the human face in the human face image is acquired by detecting using a Canny edge detection operator.

Optionally, the sub-step of fitting a profile edge curve of human face edge in the human face image includes:

filtering the detected strong edge of the human face in the human face image to obtain a profile curve of the human face in the human face image;

in the human face image corresponding to the profile curve of the human face, making at least one ray according to a set angle by using at least one feature point corresponding to the five sense organs of the human face in the human face image as an endpoint of the ray; and in the human face image corresponding to the profile curve of the human face, acquiring an intersection of the ray and the profile curve of the human face in the human face image and fitting a third-order Bezier curve to serve as the profile edge curve of the human face edge in the human face image.

Optionally, the step of calculating by using a preset human face edge feature point calculation model to obtain feature points of the human face edge in the human face image includes:

calculating by using the human face edge feature point calculation model in combination with pre-trained parameters to obtain position information of each feature point of the human face edge in the human face image;

acquiring a gradient direction feature of each feature point, acquired in the above calculation, in a region with the feature point itself as the center and having a set size or a set shape; and using the position information and the gradient direction feature of each feature point as respective feature information of each feature point respectively.

Optionally, the convergence algorithm includes:

$$\Delta X_1 = R_0 * \phi_0 + b_0;$$

$$X_k = X_{k-1} + R_{k-1} * \phi_{k-1} + b_{k-1};$$

wherein, $X_k$ is a vector formed by connecting convergence feature points obtained after calculation by using the convergence algorithm for the $k^{th}$ time, and $X_{k-1}$ is a vector formed by connecting convergence feature points obtained after calculation by using the convergence algorithm for the $(k-1)^{th}$ time;

$\Delta X_1$ is an offset value between a vector $X_1$ formed by connecting convergence feature points obtained after calculation by using the convergence algorithm for the first time and a vector $X_0$ formed by connecting the feature points of the human face edge in the human face image; $\phi_0$ is a vector formed by connecting gradient direction features of the feature points before calculation by using the convergence algorithm for the first time; and $R_0$ and $b_0$ are preset coefficients; and $R_{k-1}$ and $b_{k-1}$ are coefficients after calculation by using the convergence algorithm for the $(k-1)^{th}$ time, and $\phi_{k-1}$ is a vector formed by connecting gradient direction features of convergence feature points obtained after calculation by using the convergence algorithm for the $(k-1)^{th}$ time.

Optionally, the step of determining whether a magnitude of overall position change of all the feature points of the human face edge in the human face image before and after the above determination is less than a preset threshold includes:

calculating, according to feature information of all the feature points of the human face edge in the human face image before and after the above determination, a magnitude of overall position change of all the feature points of the human face edge in the human face image before and after the above determination; and determining whether the magnitude of the position change is less than a preset threshold;

if the magnitude is less than the preset threshold, determining that feature information of each feature point of the human face edge in the human face image is unchanged; and if the magnitude is not less than the preset threshold, returning to the step of calculating by using a preset convergence algorithm to obtain feature information of a convergence feature point corresponding to each feature point according to the feature information of each feature point.

Optionally, the sub-step of calculating a magnitude of overall position change of all the feature points of the human face edge in the human face image before and after the above determination includes:

acquiring a vector formed by connecting all feature points of the human face edge in the human face image before the above determination;

acquiring a vector formed by connecting all feature points of the human face edge in the human face image after the above determination; and calculating a Euclidean distance between the two vectors to serve as the magnitude of overall position change of all the feature points of the human face edge in the human face image before and after the above determination.

The present disclosure further provides an apparatus for positioning feature points of human face edge, including:

a profile edge curve fitting unit that fits a profile edge curve of human face edge in a human face image according to the human face image;

a feature information calculation unit that calculates by using a preset human face edge feature point calculation model to obtain feature points of the human face edge in the human face image, and acquire feature information of each feature point, wherein the feature information includes at least position information;

a convergence calculation unit that calculates by using a preset convergence algorithm to obtain feature information of a convergence feature point corresponding to each feature point according to the feature information of each feature point;

a convergence direction determination unit that determines respectively whether a distance from each feature point to the profile edge curve is greater than a distance from a respective corresponding convergence feature point to the profile edge curve according to feature information of each feature point and each convergence feature point; if a result is positive, acquires the feature information of the convergence feature point corresponding to the feature point to serve as the feature information of the feature point; if a result is negative, keeps the feature information of the feature point unchanged;

a convergence magnitude determination unit that determines whether a magnitude of overall position change of all the feature points of the human face edge in the human face image before and after the above determination is less than a preset threshold; if the magnitude is less than the preset threshold, turns to a feature information determination unit; if the magnitude is not less than the preset threshold, turns to the convergence calculation unit; and the feature information determination unit that positions position information of the group of feature points as qualified feature points of human face edge.

Optionally, the apparatus for positioning feature points of human face edge includes:

a human face image acquisition unit that acquires a human face image of a human face; and a skin color filtering unit that separates skin color regions and non-skin color regions in the human face image by using a preset skin color model, and filter out the non-skin color regions in the human face image.

Optionally, the apparatus for positioning feature points of human face edge includes:

a human face image formatting unit that expand or clip the acquired human face image into a human face image having a set size and/or format.

Optionally, the profile edge curve fitting unit includes:

a strong edge detection sub-unit that detects strong edge of a human face in the human face image; and a profile edge curve fitting sub-unit that fits a profile edge curve of human face edge in the human face image according to the detected strong edge of the human face in the human face image.

Optionally, the profile edge curve fitting sub-unit includes:

a strong edge filtering sub-unit that filters the detected strong edge of the human face in the human face image, so as to obtain a profile curve of the human face in the human face image;

a ray setting sub-unit that, in the human face image corresponding to the profile curve of the human face, makes at least one ray according to a set angle by using at least one feature point corresponding to the five sense organs of the human face in the human face image as an endpoint of the ray; and a fitting sub-unit that, in the human face image corresponding to the profile curve of the human face, acquires an intersection of the ray and the profile curve of the human face in the human face image, and fits a third-order Bezier curve to serve as the profile edge curve of the human face edge in the human face image.

Optionally, the feature information calculation unit includes:

a position information calculation acquisition sub-unit that obtains position information of each feature point of the human face edge in the human face image by using the human face edge feature point calculation model;

a gradient direction feature acquisition sub-unit that acquires a gradient direction feature of each feature point in a region with the feature point itself as the center and having a set size or a set shape; and a feature information acquisition sub-unit that respectively uses the position information and the gradient direction feature of each feature point as respective feature information of each feature point.

Optionally, the convergence magnitude determination unit includes:

a position change magnitude calculation sub-unit that calculates, according to feature information of all the feature points of the human face edge in the human face image before and after the above determination, a magnitude of overall position change of all the feature points of the human face edge in the human face image before and after the above determination; and a position change magnitude determination sub-unit that determines whether the magnitude of the position change is less than a preset threshold;

if the magnitude is less than the preset threshold, turns to a feature information determination sub-unit; and if the magnitude is not less than the preset threshold, turns to the convergence calculation unit;

the feature information determination sub-unit that determines that feature information of each feature point of the human face edge in the human face image is unchanged.

Optionally, the position change magnitude calculation sub-unit includes:

a first vector acquisition sub-unit that acquires a vector formed by connecting all feature points of the human face edge in the human face image before the above determination;

a second vector acquisition sub-unit that acquires a vector formed by connecting all feature points of the human face edge in the human face image after the above determination; and a Euclidean distance calculation sub-unit that calculates a Euclidean distance between the above two vectors to serve as the magnitude of overall position change of all the feature points of the human face edge in the human face image before and after the above determination.

Compared with the conventional techniques, the techniques of the present disclosure have the following advantages:

A method for positioning feature points of human face edge provided in the present disclosure includes: fitting a profile edge curve of human face edge in a human face image according to the human face image; calculating by using a preset human face edge feature point calculation model to obtain feature points of the human face edge in the human face image, and acquiring feature information of each feature point, wherein the feature information includes at least position information; calculating by using a preset convergence algorithm to obtain feature information of a convergence feature point corresponding to each feature point according to the feature information of each feature point; determining respectively whether a distance from each feature point to the profile edge curve is greater than a distance from a respective corresponding convergence feature point to the profile edge curve according to feature information of each feature point and each convergence feature point; if a result is positive, acquiring the feature information of the convergence feature point corresponding to the feature point to serve as the feature information of the feature point; if a result is negative, keeping the feature information of the feature point unchanged; determining whether a magnitude of overall position change of all the feature points of the human face edge in the human face image before and after the above determination is less than a preset threshold; if the magnitude is less than the preset threshold, positioning position information of the group of feature points as qualified feature points of human face edge; and if the magnitude is not less than the preset threshold, returning to the step of calculating by using a preset convergence algorithm to obtain feature information of a convergence feature point corresponding to each feature point according to the feature information of each feature point.

In the method for positioning feature points of human face edge provided in the present disclosure, a profile edge curve of human face edge in a human face image is fitted according to the human face image, feature points of the human face edge in the human face image is obtained by using a human face edge feature point calculation model, position information and a gradient direction feature are extracted for each feature point, and positions of the feature points of human face edge are positioned by using linear regression. Moreover, convergence directions of the feature points during the process of linear regression are constrained and corrected by using the fitted profile edge curve, which improves the accuracy of positioning of the feature points of human face edge, and implements positioning of feature points of human face edge for human face images having different backgrounds, thereby making a wider application scope.

DETAILED DESCRIPTION

Many specific details are illustrated in the following descriptions for full understanding of the present disclosure. However, the present disclosure may be implemented in many other manners different from those described herein, and persons skilled in the art may make similar promotions without departing from the spirit of the present disclosure, and therefore, the present disclosure is not limited by the specific implementations disclosed in the following.

The present disclosure provides a method for positioning feature points of a human face edge, and the present disclosure further provides an apparatus for positioning feature points of a human face edge.

The present disclosure provides an example method embodiment for positioning feature points of a human face edge as follows.

A method for positioning feature points of a human face edge provided in this example embodiment is illustrated below with reference to FIG. 1 to FIG. 11, and steps of the method are illustrated.

Figure 1:
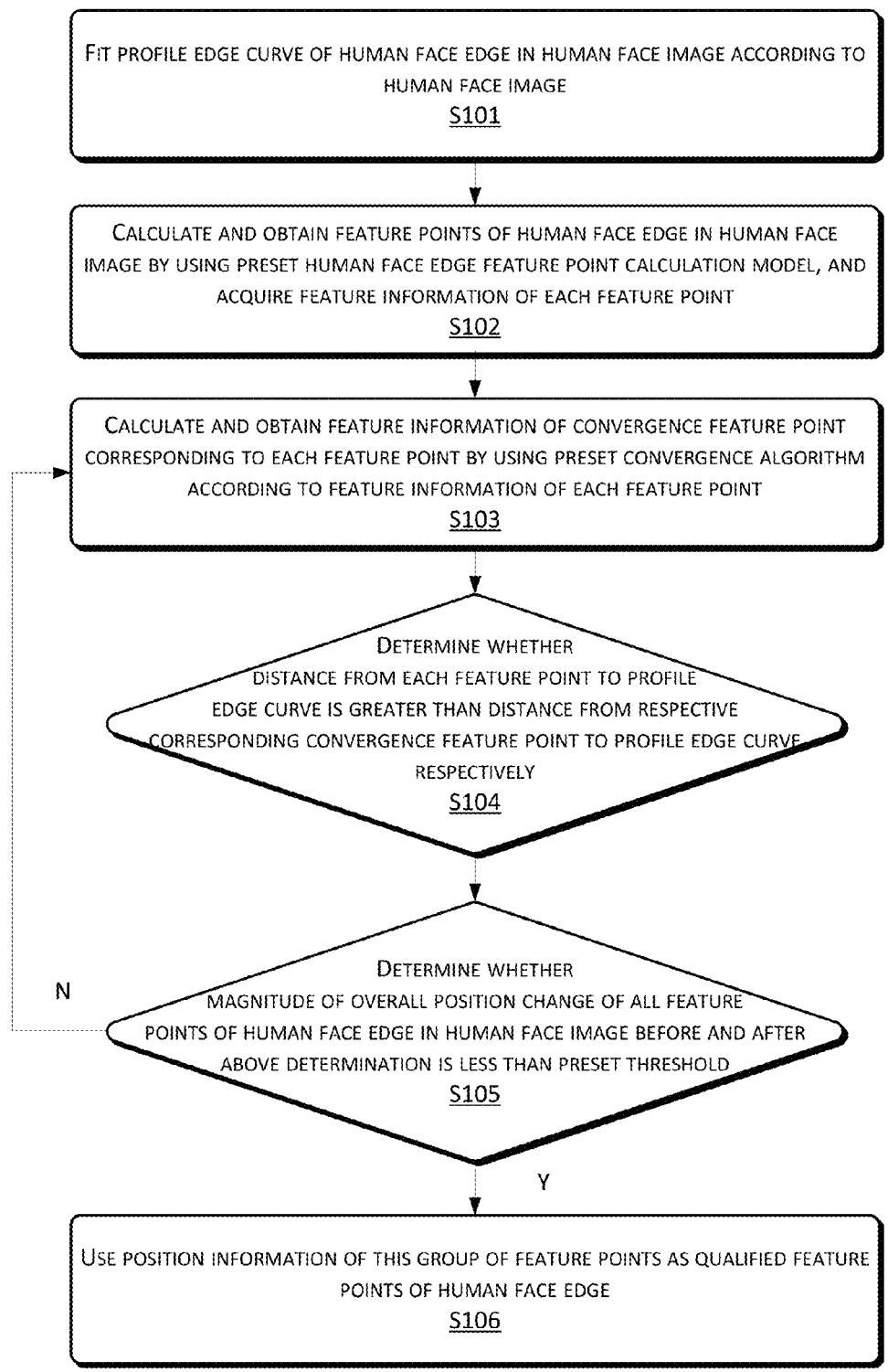
FIG. 1 is a flow chart of an example method for positioning feature points of a human face edge provided in a first example embodiment of the present disclosure.
Figure 2:
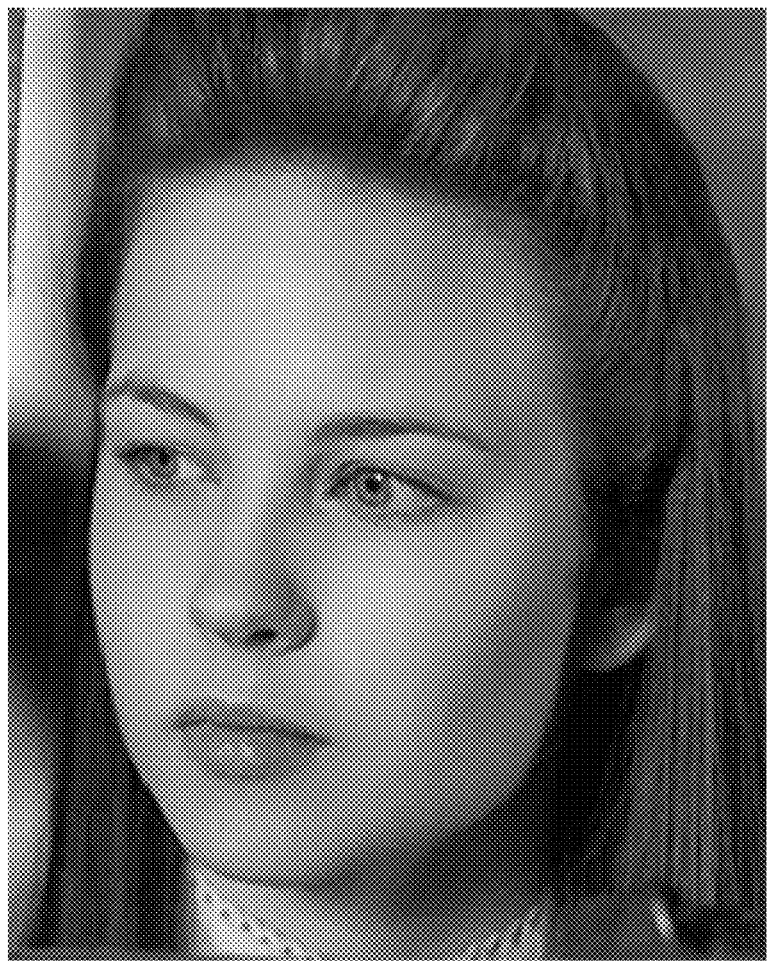
FIG. 2 is a schematic diagram of an example human face image provided in the first example embodiment of the present disclosure.
Figure 3:
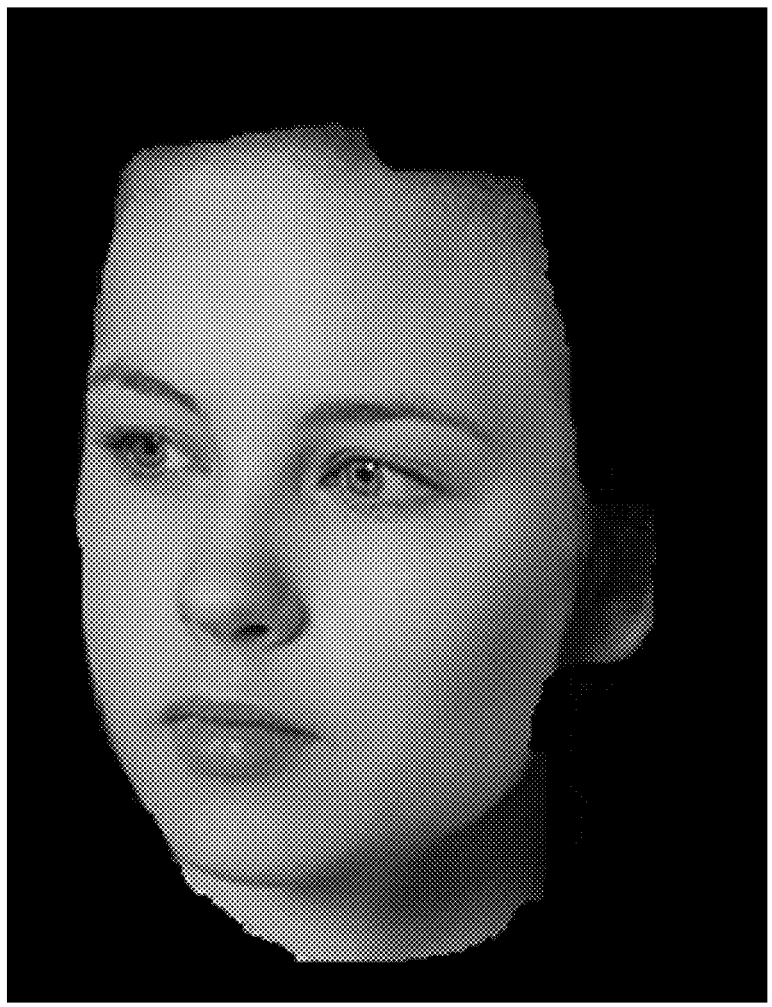
FIG. 3 is a schematic diagram of an example human face image after being processed by using a Gaussian mixture model provided in the first example embodiment of the present disclosure.
Figure 4:
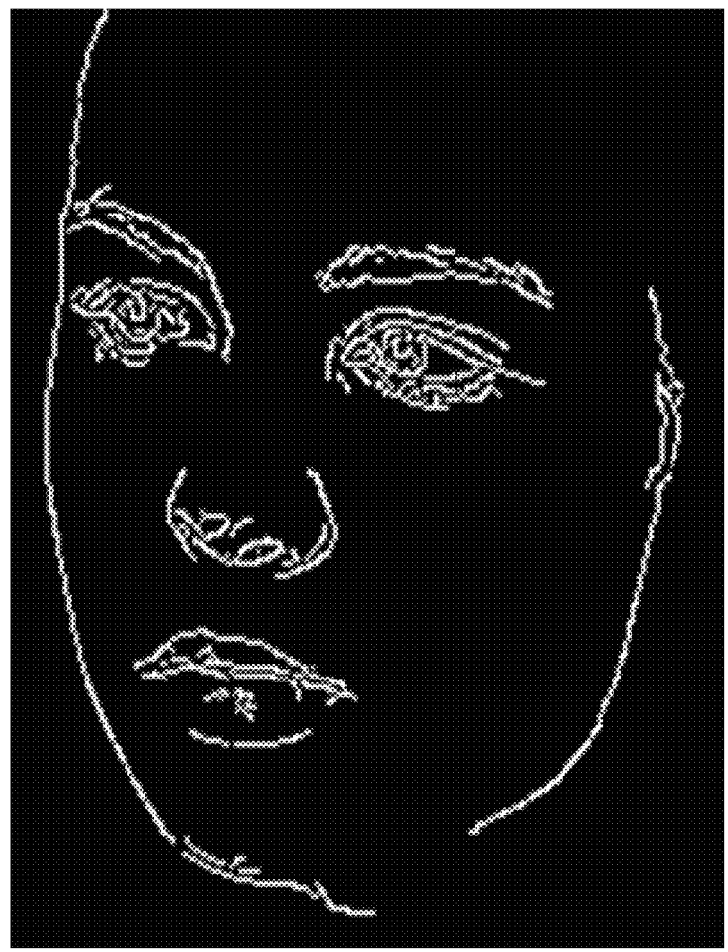
FIG. 4 is a schematic diagram of example strong edge of a human face in a human face image provided in the first example embodiment of the present disclosure.
Figure 5:
FIG. 5 is a schematic diagram of an example profile curve of a human face in a human face image provided in the first example embodiment of the present disclosure.
Figure 6:
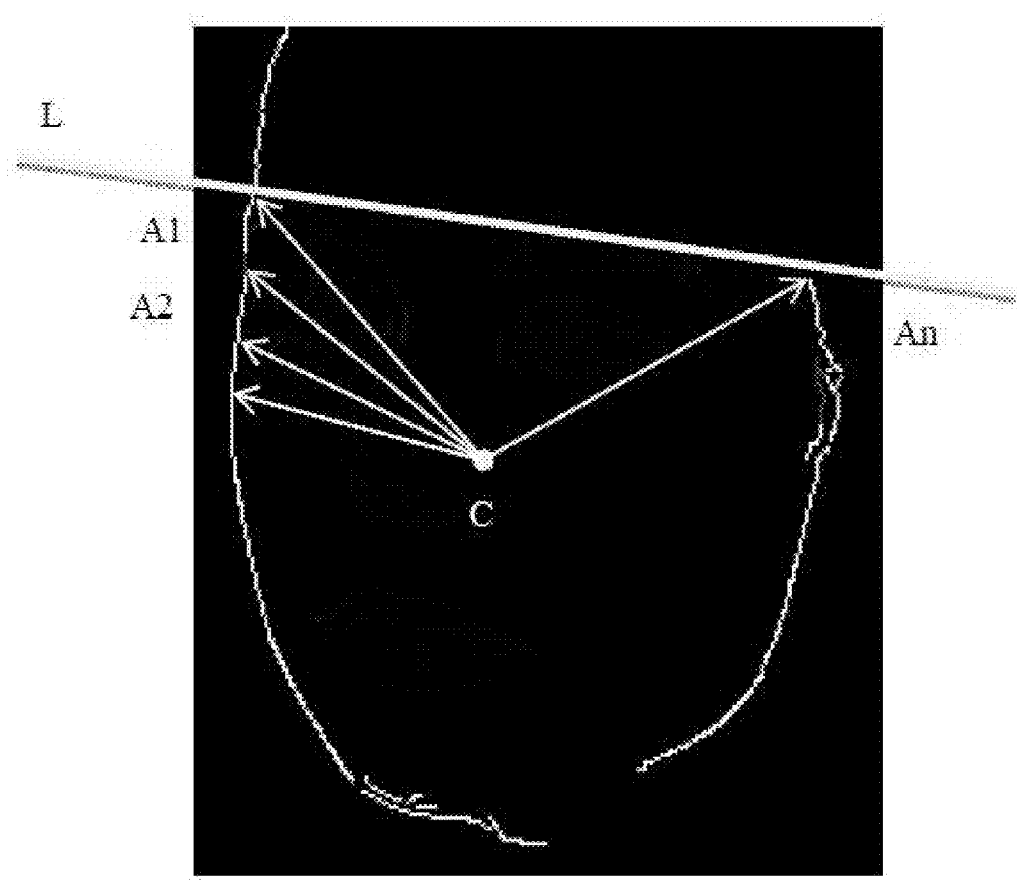
FIG. 6 is a schematic diagram of fitting an example profile edge curve of a human face edge in a human face image provided in the first example embodiment of the present disclosure.
Figure 7:
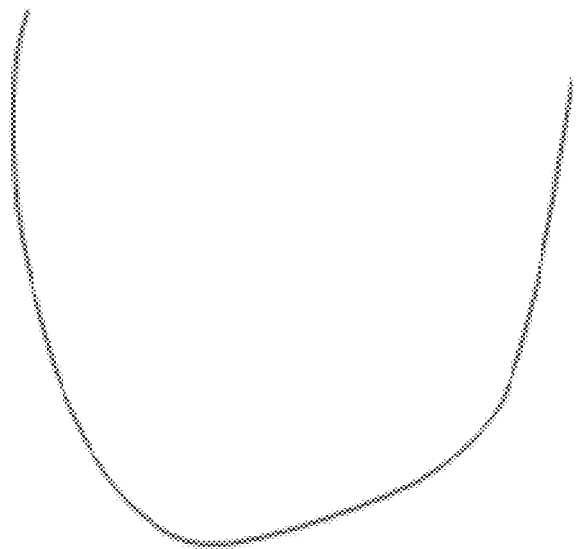
FIG. 7 is a schematic diagram of an example profile edge curve of a human face edge in a human face image provided in the first example embodiment of the present disclosure.
Figure 8:
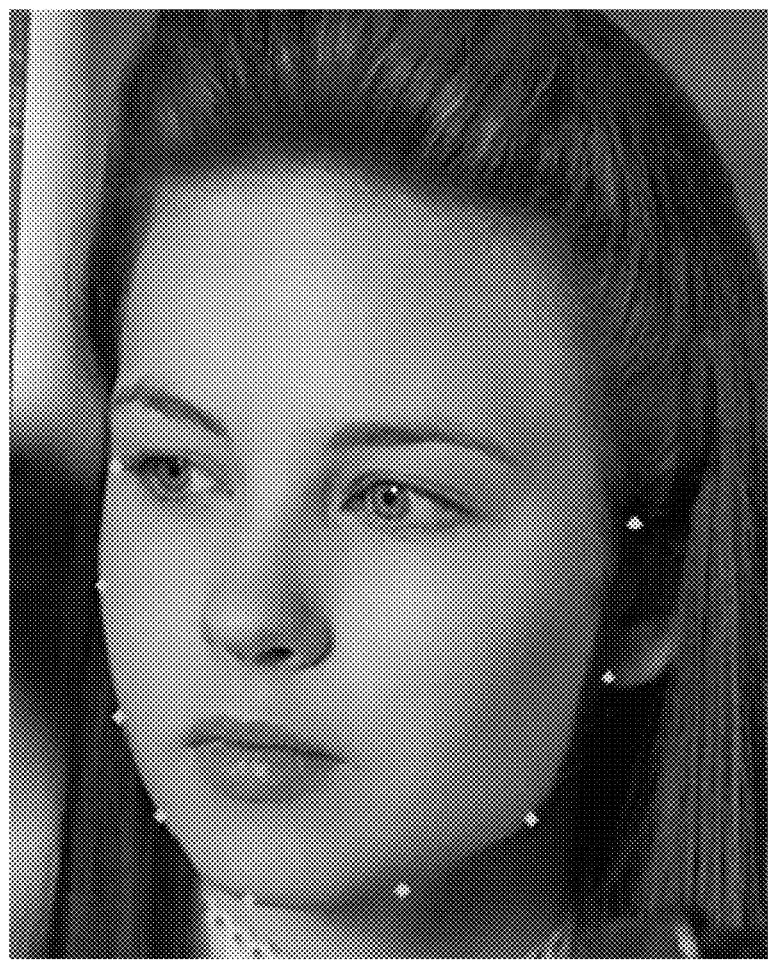
FIG. 8 is a schematic diagram of example feature points of human face edge in a human face image provided in the first example embodiment of the present disclosure.
Figure 9:
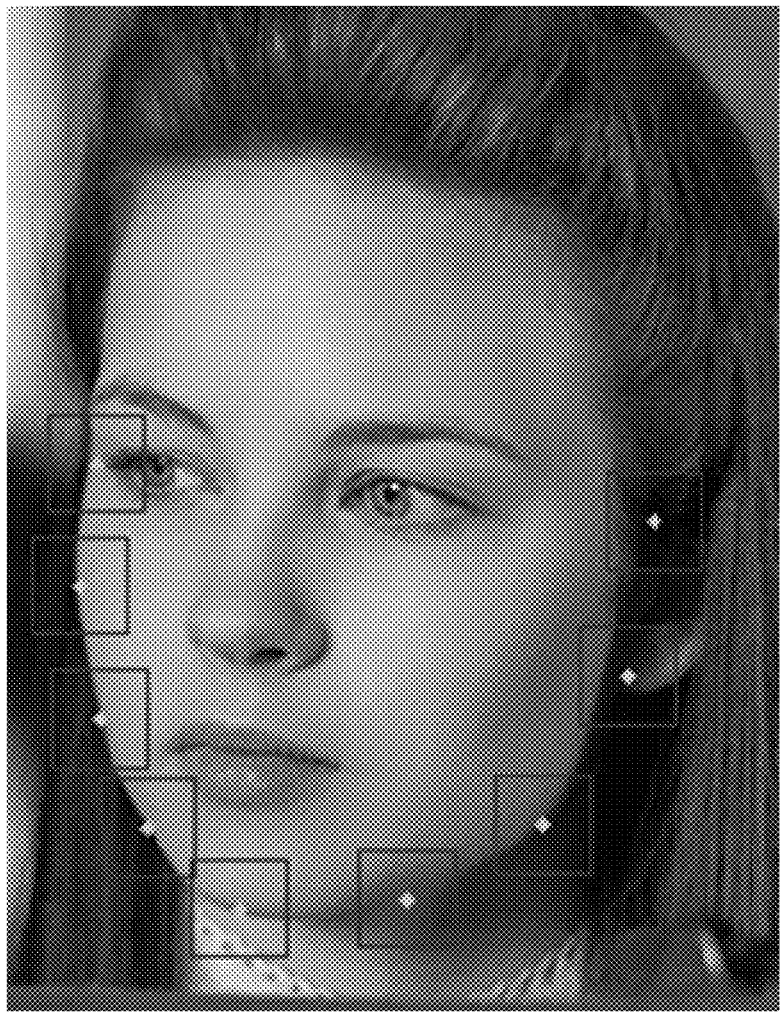
FIG. 9 is a schematic diagram of example gradient direction features of feature points of human face edge in a human face image provided in the first example embodiment of the present disclosure.
Figure 10:
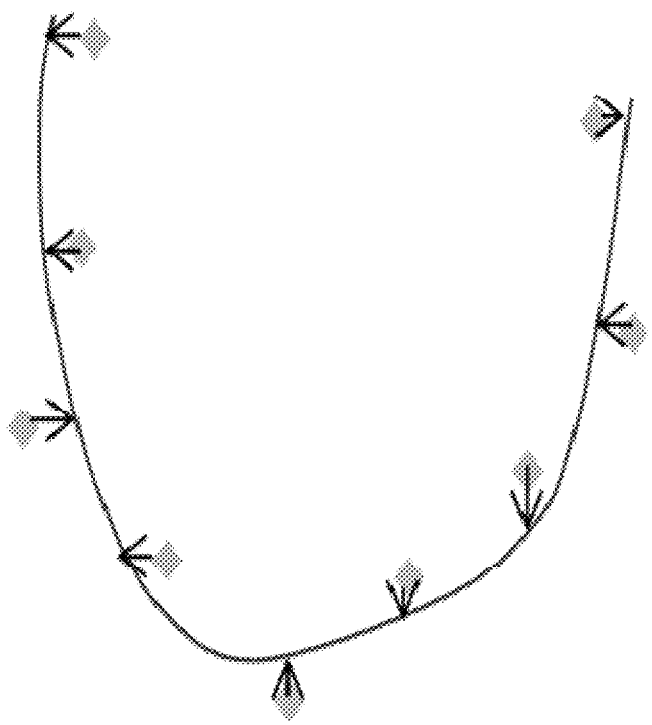
FIG. 10 is a schematic diagram of example convergence directions of feature points of human face edge relative to a profile edge curve provided in the first example embodiment of the present disclosure.
Figure 11:
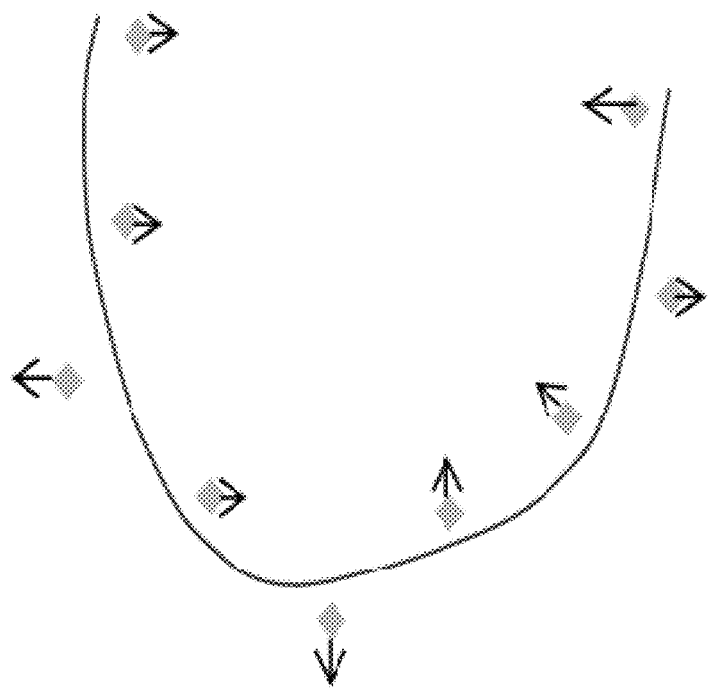
FIG. 11 is another schematic diagram of example convergence directions of feature points of human face edge relative to a profile edge curve provided in the first example embodiment of the present disclosure.

FIG. 1 is a flow chart of a method for positioning feature points of human face edge provided in this example embodiment, FIG. 2 is a schematic diagram of a human face image provided in this example embodiment, FIG. 3 is a schematic diagram of a human face image after being processed by using a Gaussian mixture model provided in this example embodiment; FIG. 4 is a schematic diagram of strong edge of a human face in a human face image provided in this example embodiment; FIG. 5 is a schematic diagram of a profile curve of a human face in a human face image provided in this example embodiment; FIG. 6 is a schematic diagram of fitting a profile edge curve of a human face edge in a human face image provided in this example embodiment; FIG. 7 is a schematic diagram of a profile edge curve of a human face edge in a human face image provided in this example embodiment; FIG. 8 is a schematic diagram of feature points of a human face edge in a human face image provided in this example embodiment; FIG. 9 is a schematic diagram of gradient direction features of feature points of a human face edge in a human face image provided in this example embodiment; FIG. 10 is a schematic diagram of convergence directions of feature points of a human face edge relative to a profile edge curve provided in this example embodiment; and FIG. 11 is another schematic diagram of convergence directions of feature points of human face edge relative to a profile edge curve provided in this example embodiment.

Referring to FIG. 1, a processing flow chart of an example method for positioning feature points of human face edge provided in this example embodiment is shown.

S101: A profile edge curve of a human face edge in a human face image is fitted according to the human face image.

It should be noted that, in this example embodiment, before the step of fitting a profile edge curve of a human face edge in a human face image according to the human face image, the method further includes the following steps.

1. A human face image of a human face is acquired.

The human face image is a source of data in this example embodiment, and is a basis of implementing positioning of feature points of human face edge.

Certainly, in addition to the human face, the human face image acquired in this step may also include other background objects, and there is no requirement on format and size of the acquired human face image. For example, the acquired human face image may be an identification photo, and may also be a common selfie, or other images including background objects such as hair and clothes except for the human face.

2. The acquired human face image is expanded into a human face image having a set size.

For example, the size includes the pixel values of the width and height of the human face image, the size of the occupied bytes, and the size of the dimension.

In this step, the size of the human face image acquired in the step 1 is unified, and the acquired human face image is expanded into a human face image in a rectangular shape having a specific size, as shown in FIG. 2. FIG. 2 shows the human face image obtained after the expansion according to this step.

In this example embodiment, all of the human face images described in the following refer to the human face image shown in FIG. 2.

It should be noted that, in addition to the aforementioned method of expanding the acquired human face image into a human face image having a set size, other methods may also be used for implementation. For example, the acquired human face image is clipped into a human face image having a set size, or the acquired human face image is saved as a human face image having a set format, wherein the format includes project type (such as bmp, jpg, tiff, and gif), resolution and the like of the human face image, which is not limited herein.

3. Skin color regions and non-skin color regions in the human face image are separated by using a preset skin color model, and the non-skin color regions in the human face image are filtered out.

For example, the preset skin color model refers to a Gaussian Mixture Model (GMM).

The Gaussian mixture model uses K (generally 3 to 5) Gaussian models to represent features of pixel points in the human face image. The Gaussian mixture model is updated after a new frame of the human face image is acquired. Each feature point in the current human face image is matched with the Gaussian mixture model; if a certain feature point is matched successfully, it is determined that the feature point is a background point, which indicates that the feature point is a background portion in the human face image; if a certain feature point is matched unsuccessfully, it is determined that the feature point is a foreground point, which indicates that the feature point is a feature point in a human face range in the human face image.

In this example embodiment, with respect to the human face image shown in FIG. 2, the human face image is processed by using the Gaussian mixture model, so as to separate the skin color regions and the non-skin color regions in the human face image, and filter out the non-skin color regions in the human face image, and the finally acquired human face image is shown in FIG. 3. FIG. 3 shows a human face image after being processed by using a Gaussian mixture model.

It should be noted that, in addition to the Gaussian mixture model provided in the above, other models may be used to implement filtering of human face color skin in the human face image, which are not limited herein.

4. Strong edge of a human face in the human face image is detected.

For example, the strong edge of the human face in the human face image is detected by using a Canny edge detection operator, and an example implementation is described as follows.

1) The above acquired human face image is smoothened by using a Gaussian filter.

As shown in FIG. 3, the human face image shown in FIG. 3 is used as input of this step, and after the human face image is input, the human face image is smoothed by using a Gaussian filter, thereby reaching the objective of removing noise.

2) An edge gradient of the human face image is calculated.

The magnitude and direction of the gradient are calculated by using a first partial derivative finite difference, thereby calculating a gradient value and a gradient direction of each pixel point in the human face image.

3) Non-maxima suppression is performed.

What the calculation in the above step 2) obtains is global gradient features of the human face image, which is insufficient to determine the edge of the human face in the human face image, and therefore, in this step, non-maxima suppression (NMS) is used to determine the pixel points of the human face edge in the human face image.

4) The strong edge of the human face in the human face image is generated.

For example, with respect to the human face image acquired after the non-maxima suppression is performed in the step 3), in this step, the strong edge of the human face in the human face image is detected and connected by using a double-threshold algorithm. It is set that the human face image after the non-maxima suppression is N (i, j), the double thresholds are $t_1$ and $t_2$ with $t_2 \approx 2*t_1$, and $t_1$ and $t_2$ are enabled to act on the human face image N (i, j) to obtain an edge image $T_1$ (i, j) and an edge image $T_2$ (i, j).

Since the edge image $T_2$ (i, j) is obtained by using a high threshold, it contains little fake edge, but has intervals (not closed). By using the edge image $T_2$ (i, j) as the basis, pixel points of the human face edge are connected into a human face profile in the edge image $T_2$ (i, j). When an endpoint of the human face profile is reached, pixel points that are qualified to be connected to the human face profile are searched for in the edge image $T_1$ (i, j) for connection, until the pixel points of the human face edge in the edge image $T_2$ (i, j) are connected, so as to acquire the strong edge of the human face in the human face image. As shown in FIG. 4, FIG. 4 shows the strong edge of the human face in the human face image calculated by using the Canny edge detection operator.

It should be noted that, in addition to the method of detecting the strong edge of the human face in the human face image provided in the above, other methods may also be used for implementation, which are not limited herein.

5. A profile edge curve of the human face edge in the human face image is fitted according to the strong edge of the human face in the human face image.

In step 4, the strong edge of the human face in the human face image is detected and acquired. In this step, the profile edge curve of the human face edge in the human face image is fitted according to the strong edge of the human face in the human face image acquired in the step 4.

In this example embodiment, according to the strong edge of the human face in the human face image detected in the step 4, as shown in FIG. 4, the profile edge curve of the human face edge in the human face image is fitted in combination with feature points of the five sense organs such as eyebrows, nose, eyes and mouth in the human face in FIG. 4, and an example implementation is described as follows.

1) According to the highest points of left and right eyebrows of the human face in the strong edge of the human face shown in FIG. 4, the highest points are connected to form a line, for example, a line L shown in FIG. 6.

It should be noted that, feature points of the five sense organs, such as eyebrows, nose, eyes and mouth, in the human face in the human face image are already positioned, and according to positions of the feature points, the feature points in the human face image are removed to obtain a profile curve of the human face in the human face image, as shown in FIG. 5.

In the profile curve of the human face in the human face image shown in FIG. 5, a part of the human face edge in the human face image is not detected, and therefore, the profile curve of the human face is interrupted and discontinuous.

2) According to a nose tip of the nose of the human face in the strong edge of the human face shown in FIG. 4, for example, a point C shown in FIG. 6, a ray is made every 5 degrees by using the point C as the center point. For example, rays shown in FIG. 6 may have intersections with the profile curve of the human face in the human face image shown in FIG. 5, or may not have intersections.

As shown in FIG. 6, A1, A2, . . . , An are sequentially intersections of rays shown in FIG. 6 and the profile curve of the human face.

3) The intersections A1, A2, . . . , An in the above step are acquired to fit a third-order Bezier curve to serve as the profile edge curve of the human face edge in the human face image, as shown in FIG. 7. FIG. 7 shows the profile edge curve of the human face edge in the human face image.

It should be noted that, in addition to the method of fitting the profile edge curve of the human face edge in the human face image as described in the above, other methods may also be used for implementation, which are not limited herein.

S102: Feature points of the human face edge in the human face image are calculated and obtained by using a preset human face edge feature point calculation model, and feature information of each feature point is acquired.

In this example embodiment, the feature information includes position information and a gradient direction feature.

The position information refers to a coordinate value of each feature point.

The gradient direction feature refers to a Histogram of Oriented Gradient (HOG) feature, and is a feature descriptor used for performing object detection in computer vision and image processing, and the histogram of oriented gradient feature constructs a feature by calculating and making statistics of gradient direction histograms of local regions of an image.

An example implementation is described as follows:

1. The human face image shown in FIG. 2 is input, and calculation is conducted by using the human face edge feature point calculation model in combination with pre-trained parameters to obtain position information of feature points of the human face edge in the human face image, that is, a coordinate value of each feature point.

It should be noted that, the feature points of the human face edge in the human face image obtained herein are predicted feature points of the human face edge in the human face image, instead of actual feature points of the human face edge in the human face image. As shown in FIG. 8, white dots distributed on the human face edge in FIG. 8 are the feature points of the human face edge in the human face image.

In addition, the position information of the feature points of the human face edge in the human face image is initial position information, and is a data basis of performing convergence calculation for the feature points by using a preset convergence algorithm in the following step S103.

2. The feature points of the human face edge in the human face image are acquired according to the calculation in the step 1. For example, pixel information of each feature point in a rectangular frame with the feature point itself as the center and having a size of 16*16 pixels is acquired, and a gradient histogram feature of each feature point is obtained through statistics according to the pixel information, as shown in FIG. 9, in which gradient histogram features of the feature points of the human face edge in the human face image are shown.

In addition, gradient histogram features in regions having other sizes or shapes may also be acquired, which are not limited herein.

3. According to the coordinate values of the feature points of the human face edge in the human face image obtained through the calculation in the step 1 and the gradient histogram features of the feature points of the human face edge in the human face image obtained through the calculation in the step 2, the coordinate value and the gradient histogram feature of each feature point are respectively used as respective feature information of the feature point.

It should be noted that, in addition to the method of calculating the feature points and the feature information of the feature points, other methods may be used for implementation, which are not limited herein.

S103: According to the feature information of each feature point, feature information of a convergence feature point corresponding to each feature point is calculated and obtained by using the preset convergence algorithm.

According to the feature information of each feature point obtained in the step S102, in this step, convergence calculation is conducted on the feature points of the human face edge in the human face image by using the preset convergence algorithm. An example implementation is described as follows.

The convergence algorithm used in this example embodiment is:

$$\Delta X_1 = R_0 * \phi_0 + b_0;$$

$$X_k = X_{k-1} + R_{k-1} * \phi_{k-1} + b_{k-1}.$$

It is assumed that the number of the feature points is m (which may be any integer), $X_k$ is a vector formed by connecting m convergence feature points obtained through calculation by using the convergence algorithm for the $k^{th}$ time, and $X_k$ may be expressed as:

$$(x_{k+1}^1, y_{k+1}^1, x_{k+1}^2, y_{k+1}^2, \ldots, x_{k+1}^m, y_{k+1}^m)$$

It should be noted that, $X_0$ is a vector formed by connecting the feature points obtained through calculation by using the human face edge feature point calculation model in the step S102, that is, a vector formed by connecting m feature points before calculation by using the convergence algorithm for the first time.

$\phi_0$ is a vector formed by connecting gradient histogram features of the feature points obtained through calculation by using the human face edge feature point calculation model in the steep S102, that is, a vector formed by connecting gradient direction features of m feature points before calculation by using the convergence algorithm for the first time.

Moreover, R0 and b0 are preset coefficients, and in this example embodiment, R0 and b0 are obtained by training according to training data.

$\Delta X_1$ is an offset value between a vector $X_1$ formed by connecting convergence feature points obtained after calculation by using the convergence algorithm for the first time and a vector $X_0$ formed by connecting the feature points of the human face edge in the human face image.

$x_{k-1}$ is a vector formed by connecting convergence feature points obtained after calculation by using the convergence algorithm for the $(k-1)^{th}$ time.

$R_{k-1}$ and $b_{k-1}$ are coefficients after calculation by using the convergence algorithm for the $(k-1)^{th}$ time.

$\phi_{k-1}$ is a vector formed by connecting gradient direction features of the convergence feature points obtained after calculation by using the convergence algorithm for the $(k-1)^{th}$ time.

In addition, the aforementioned convergence algorithm may use convergence algorithms other than that used in this example embodiment, which are not limited herein.

S104: Whether a distance from each feature point to the profile edge curve is greater than a distance from a respective corresponding convergence feature point to the profile edge curve is determined respectively.

The profile edge curve of the human face edge in the human face image is obtained in the step S101, and feature information of each feature point and each convergence feature point is obtained through calculation by using the convergence algorithm in the step S103. In this step, in the process of the convergence calculation, whether the convergence feature point is closer to the profile edge curve relative to the feature point is determined, that is, whether the convergence feature point is closer to an actual edge profile of the human face in the human face image is determined. An example implementation is described in the following.

1. A distance from each feature point to the profile edge curve is calculated respectively, and a distance from a convergence feature point corresponding to each feature point to the profile edge curve is calculated respectively.

2. Whether the distance from each feature point to the profile edge curve is greater than the distance from the respective corresponding convergence feature point to the profile edge curve is determined respectively.

If a result is positive, it indicates that in the process of this convergence calculation, the feature point converges (moves) in the direction approaching the profile edge curve, that is, the convergence direction of the feature point moves in the direction approaching the actual edge profile of the human face in the human face image, being closer to the actual edge profile of the human face in the human face image. Thus the convergence direction is correct, and the feature point is moved to the position of the convergence feature point corresponding to the feature point, that is, the feature information of the convergence feature point corresponding to the feature point is acquired to serve as the feature information of the feature point.

If a result is negative, it indicates that in the process of this convergence calculation, the feature point converges in a direction away from the profile edge curve, that is, the convergence direction of the feature point moves in the direction away from the actual edge profile of the human face in the human face image, being farther from the actual edge profile of the human face in the human face image.

Thus the convergence direction is wrong, and therefore, the position of the feature point is kept unchanged.

It should be noted that, in addition to the determining method provided in the foregoing, other methods may also be used to determine whether the convergence feature point is closer to the actual edge profile of the human face in the human face image. For example, whether a direction of each feature point pointing to a respective corresponding convergence feature point is consistent with a direction of the feature point pointing to the profile edge curve is determined respectively.

Referring to FIG. 10, in the feature points and the profile edge curve of the human face in the human face image shown in FIG. 10, directions of all feature points pointing to respective corresponding convergence feature points are consistent with their directions pointing to the profile edge curve, which indicates that convergence directions of all the feature points move in the direction approaching the actual edge profile of the human face in the human face image, being closer to the actual edge profile of the human face in the human face image. Thus the convergence directions are correct, then the feature points are moved to the positions of the convergence feature points corresponding to the feature points.

Referring to FIG. 11, in the feature points and the profile edge curve of the human face in the human face image shown in FIG. 11, directions of all feature points pointing to respective corresponding convergence feature points are all inconsistent with their directions pointing to the profile edge curve, which indicates that convergence directions of all the feature points move in the direction away from the actual edge profile of the human face in the human face image, being farther from the actual edge profile of the human face in the human face image. Thus the convergence directions are wrong, then the positions of all the feature points are kept unchanged.

This step is to determine whether a convergence direction of each feature point in the process of convergence calculation is correct or not, and in addition, in this example embodiment, the magnitude of convergence of the feature point in the process of convergence calculation further needs to be determined, and therefore, the process proceeds to step S105 after this step is completed to determine whether a magnitude of overall position change of all the feature points of the human face edge in the human face image before and after the above determination is less than a preset threshold.

S105: Determine whether the magnitude of overall position change of all the feature points of the human face edge in the human face image before and after the above determination is less than the preset threshold.

According to the step S103 and step S104, after convergence calculation is conducted on each feature point by using the convergence algorithm in the step S103, and the feature information of each feature point is determined in the step S104, in this step, it is determined whether the magnitude of overall position change of all the feature points of the human face edge in the human face image before and after the determination of the step S104 is less than the preset threshold. An example implementation is described as follows.

1. According to feature information of all feature points of the human face edge in the human face image before and after the determination of the step S104, the magnitude of overall position change of all the feature points of the human face edge in the human face image before and after the determination of the step S104 is calculated.

1) A vector formed by connecting all feature points before the determination of the step S104 is acquired.

A vector $X_k$ formed by connecting all feature points of the human face edge in the human face image before the determination of the step S104 is set to $(x_k^1, x_k^2, \ldots x_k^m)$.

2) A vector formed by connecting all feature points after the determination of the step S104 is acquired.

A vector $X_{k+1}$ formed by connecting all the feature points of the human face edge in the human face image after the determination of the step S104 is set to $(x_{k+1}^1, x_{k+1}^2, \ldots x_{k+1}^m)$.

3) A Euclidean distance between the above two vectors is calculated, that is, a Euclidean distance between the above two groups of feature points is calculated to serve as the magnitude of overall position change of all the feature points of the human face edge in the human face image before and after the determination of the step S104.

In this example embodiment, a Euclidean distance between the vector $X_k$ and the vector $X_{k+1}$, that is, the Euclidean distance between the two groups of feature points may be obtained through calculation by the following formula:

$$\upsilon = |(x_k^1 - x_{k+1}^1)^2 + (x_k^2 - x_{k+1}^2)^2 + \ldots (x_k^m - x_{k+1}^m)^2|^{1/2}$$

In addition, the magnitude of overall position change of all the feature points of the human face edge in the human face image before and after the determination of the step S104 may also be calculated through other methods, which are not limited herein.

2. Whether the magnitude of position change is less than a preset threshold is determined.

The determination conducted in this step aims to prevent the step of convergence calculation of the step S103 from being conducted infinitely, and constrain the step through determination of a threshold.

If the magnitude is less than the preset threshold, the process proceeds to step S106.

If the magnitude is not less than the preset threshold, it indicate that, between two convergence calculations (that is, before and after the determination of the step S104), the magnitude of the overall change of data (that is, the magnitude of overall position change of all the feature points of the human face edge in the human face image before and after the determination of the step S104) still exceeds the preset threshold, and repeated convergence calculation is further required.

Then, the process returns to the step S103, and after the step S103 is performed, the determination step of step S104 and the related steps of the sub-step 1) in this step are repeated.

The above cyclic process is repeated, until the magnitude of overall position change of all the feature points of the human face edge in the human face image before and after the determination of the step S104 between two convergence calculations is less than the preset threshold.

S106: The position information of this group of feature points is used as qualified feature points of human face edge.

A precondition of implementing this step is that, in the step S105, the magnitude of overall position change of all the feature points of the human face edge in the human face image before and after the determination of the step S104 is less than the preset threshold, which indicates that the magnitude of the overall change of data (that is, the magnitude of overall position change of all the feature points of the human face edge in the human face image before and after the determination of the step S104) between two convergence calculations (that is, before and after the determination of the step S104) is very small, and is less than the preset threshold; therefore, convergence calculation is no longer required, and the position of each feature point of the human face edge in the human face image is kept unchanged. That is, it is determined that the feature information of each feature point of the human face edge in the human face image is unchanged.

An example embodiment of an apparatus for positioning feature points of human face edge provided in the present disclosure is described as follows.

In the above example embodiment, a method for positioning feature points of human face edge is provided, and correspondingly, the present disclosure further provides an apparatus for positioning feature points of human face edge.

Figure 12:
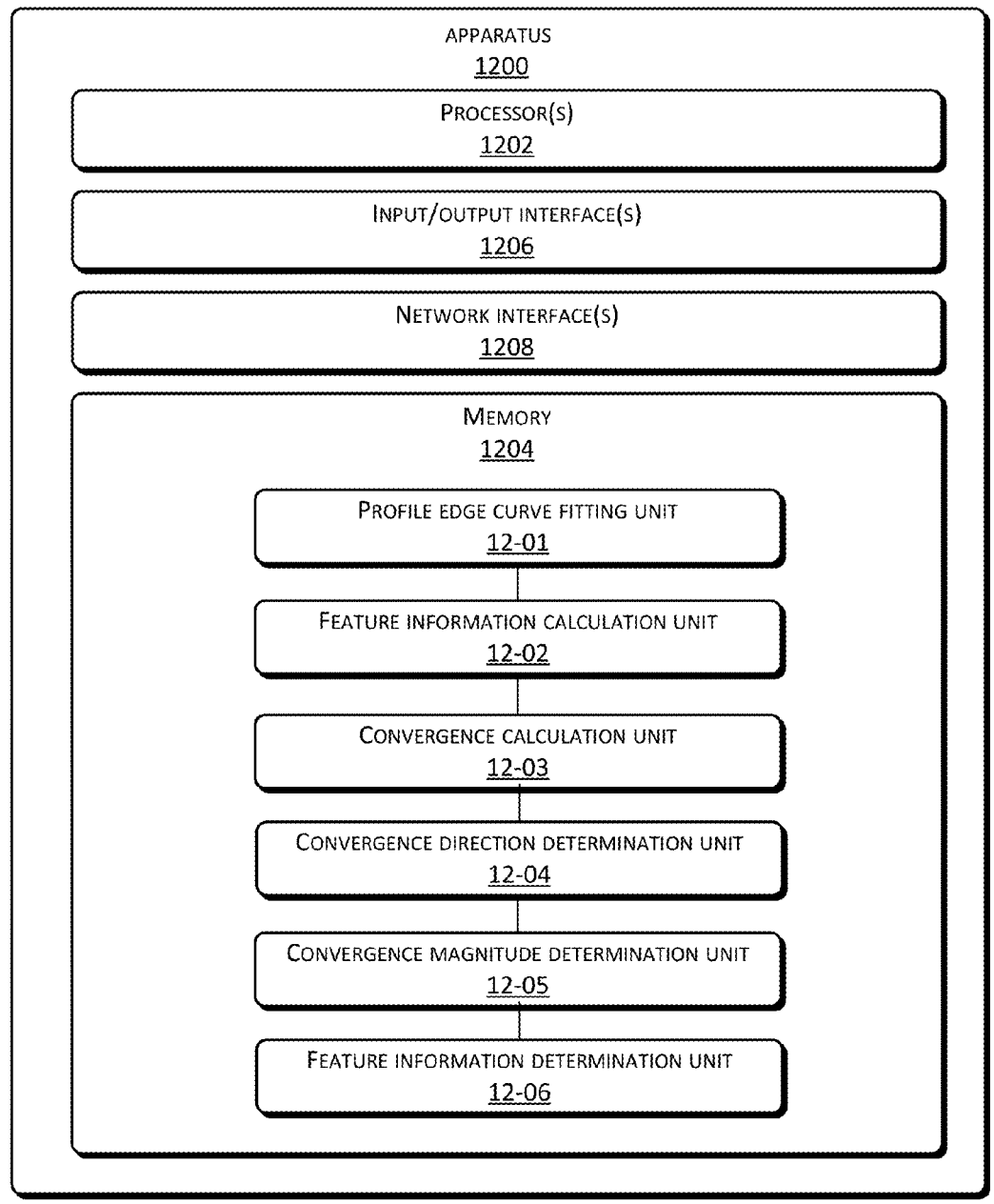
FIG. 12 is a schematic diagram of an example apparatus for positioning feature points of human face edge provided in a second example embodiment of the present disclosure.

Referring to FIG. 12, a schematic diagram of an example apparatus 1200 for positioning feature points of human face edge provided according to this example embodiment is shown. The apparatus example embodiment is basically similar to the method example embodiment, and is described more simply, and therefore, related parts may be obtained with reference to corresponding descriptions in the method example embodiment. The apparatus example embodiment described in the following is only an example.

The present disclosure provides the example apparatus 1200 for positioning feature points of human face edge, including one or more processor(s) 1202 or data processing unit(s) and memory 1204. The apparatus 1200 may further include one or more input/output interface(s) 1206, and network interface(s) 1208. The memory 1204 is an example of computer-readable media.

The memory 1204 may store therein a plurality of modules or units including:

a profile edge curve fitting unit 12-01 that fits a profile edge curve of human face edge in a human face image according to the human face image; and a feature information calculation unit 12-02 that calculates by using a preset human face edge feature point calculation model to obtain feature points of the human face edge in the human face image, and acquires feature information of each feature point; wherein the feature information includes at least position information;

a convergence calculation unit 12-03 that calculates by using a preset convergence algorithm to obtain feature information of a convergence feature point corresponding to each feature point according to the feature information of each feature point;

a convergence direction determination unit 12-04 that determines respectively whether a distance from each feature point to the profile edge curve is greater than a distance from a respective corresponding convergence feature point to the profile edge curve according to feature information of each feature point and each convergence feature point; if a result is positive, acquires the feature information of the convergence feature point corresponding to the feature point to serve as the feature information of the feature point; if a result is negative, keeps the feature information of the feature point unchanged;

a convergence magnitude determination unit 12-05 that determines whether a magnitude of overall position change of all the feature points of the human face edge in the human face image before and after the above determination is less than a preset threshold; if the magnitude is less than the preset threshold, turns to a feature information determination unit 12-06; if the magnitude is not less than the preset threshold, enter the convergence calculation unit; and a feature information determination unit 12-06 that positions position information of the group of feature points as qualified feature points of human face edge.

Optionally, the apparatus 1200 includes the following units (not shown in FIG. 12):

a human face image acquisition unit that acquires a human face image of a human face; and a skin color filtering unit that separates skin color regions and non-skin color regions in the human face image by using a preset skin color model, and filter out the non-skin color regions in the human face image.

Optionally, the apparatus 1200 includes the following unit (not shown in FIG. 12):

a human face image formatting unit that expands or clips the acquired human face image into a human face image having a set size and/or format.

Optionally, the skin color model includes a Gaussian mixture model (GMM).

Optionally, the profile edge curve fitting unit 12-01 includes the following sub-unit (not shown in FIG. 12):

a strong edge detection sub-unit that detects strong edge of a human face in the human face image; and a profile edge curve fitting sub-unit that fits a profile edge curve of human face edge in the human face image according to the detected strong edge of the human face in the human face image.

Optionally, the strong edge of the human face in the human face image is acquired by detecting using a Canny edge detection operator.

Optionally, the profile edge curve fitting sub-unit 12-01 includes the following sub-units (not shown in FIG. 12):

a strong edge filtering sub-unit that filters the detected strong edge of the human face in the human face image to obtain a profile curve of the human face in the human face image;

a ray setting sub-unit that: in the human face image corresponding to the profile curve of the human face, makes at least one ray according to a preset angle by using at least one feature point corresponding to the five sense organs of the human face in the human face image as an endpoint of the ray; and a fitting sub-unit that: in the human face image corresponding to the profile curve of the human face, acquires an intersection of the ray and the profile curve of the human face in the human face image, and fits a third-order Bezier curve to serve as the profile edge curve of the human face edge in the human face image.

Optionally, the feature information calculation unit 12-02 includes the following sub-units (not shown in FIG. 12):

a position information calculation acquisition sub-unit that obtains position information of each feature point of the human face edge in the human face image by using the human face edge feature point calculation model;

a gradient direction feature acquisition sub-unit that acquires a gradient direction feature of each feature point in a region with the feature point itself as the center and having a set size or a set shape; and a feature information acquisition sub-unit that respectively uses the position information and the gradient direction feature of each feature point as respective feature information of each feature point.

Optionally, the convergence algorithm includes:

$$\Delta X_1 = R_0 * \phi_0 + b_0;$$

$$X_k = X_{k-1} + R_{k-1} * \phi_{k-1} + b_{k-1};$$

wherein $X_k$ is a vector formed by connecting convergence feature points obtained after calculation by using the convergence algorithm for the $k^{th}$ time, and $X_{k-1}$ is a vector formed by connecting convergence feature points obtained after calculation by using the convergence algorithm for the $(k-1)^{th}$ time;

$\Delta X_1$ is an offset value between a vector $X_1$ formed by connecting convergence feature points obtained after calculation by using the convergence algorithm for the first time and a vector $X_0$ formed by connecting the feature points of the human face edge in the human face image; $\phi_0$ is a vector formed by connecting gradient direction features of the feature points before calculation by using the convergence algorithm for the first time; and R0 and b0 are preset coefficients; and $R_{k-1}$ and $b_{k-1}$ are coefficients after calculation by using the convergence algorithm for the $(k-1)^{th}$ time, and $\phi_{k-1}$ is a vector formed by connecting gradient direction features of convergence feature points obtained after calculation by using the convergence algorithm for the $(k-1)^{th}$ time.

Optionally, the convergence magnitude determination unit 12-05 includes the following sub-units (not shown in FIG. 12):

a position change magnitude calculation sub-unit that calculates, according to feature information of all the feature points of the human face edge in the human face image before and after the above determination, a magnitude of overall position change of all the feature points of the human face edge in the human face image before and after the above determination; and a position change magnitude determination sub-unit that determines whether the magnitude of the position change is less than a preset threshold; if the magnitude is less than the preset threshold, turns to a feature information determination sub-unit; and if the magnitude is not less than the preset threshold, turns to the convergence calculation unit;

the feature information determination sub-unit that determines that feature information of each feature point of the human face edge in the human face image is unchanged.

Optionally, the position change magnitude calculation sub-unit includes:

a first vector acquisition sub-unit that acquires a vector formed by connecting all feature points of the human face edge in the human face image before the above determination;

a second vector acquisition sub-unit that acquires a vector formed by connecting all feature points of the human face edge in the human face image after the above determination; and a Euclidean distance calculation sub-unit that calculates a Euclidean distance between the above two vectors, to serve as the magnitude of overall position change of all the feature points of the human face edge in the human face image before and after the above determination.

Although the present disclosure describes example embodiments, they are not used to limit the present disclosure, and any person skilled in the art may make possible variations and modifications without departing from the spirit and scope of the present disclosure; therefore, the protection scope of the present disclosure should be subject to the scope defined by the claims of the present disclosure.

In a typical configuration, a computing device, such as the apparatus, includes one or more processors (CPU), an input/output interface, a network interface, and a memory.

The memory may include the following forms of a computer readable medium: a volatile memory, a random access memory (RAM) and/or a non-volatile memory, for example, a read-only memory (ROM) or flash RAM. The memory is an example of the computer readable medium.

The computer-readable media includes volatile and non-volatile, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

As will be appreciated by persons skilled in the art, the example embodiments of the present disclosure may be embodied as a method, a system or a computer program product. Accordingly, the present disclosure may take the form of an entire hardware example embodiment, an entire software example embodiment or an example embodiment combining software and hardware aspects. Furthermore, the present disclosure may take the form of a computer program product implemented on one or more computer-readable media (including, but not limited to, magnetic disk memories, CD-ROMs, optical memories, etc.) including computer-executable instructions.

What is claimed is:

1. A method comprising:
   fitting a profile edge curve of a human face edge in a human face image according to the human face image;
   determining feature points of the human face edge in the human face image by using a preset human face edge feature point calculation model;
   acquiring feature information of a respective feature point;
   determining feature information of a convergence feature point corresponding to the respective feature point according to the feature information of the respective feature point;
   determining whether a distance from the respective feature point to the profile edge curve is greater than a distance from a corresponding respective convergence feature point to the profile edge curve according to the feature information of the respective feature point and the respective convergence feature point;
   acquiring the feature information of the respective convergence feature point corresponding to the feature point to serve as the feature information of the feature point, in response to determining that the distance from the respective feature point to the profile edge curve is greater than the distance from a corresponding respective convergence feature point to the profile edge curve; and
   outputting the feature points and the feature information of the respective feature point through an output interface for determining a shape of the human face.

2. The method of claim 1, further comprising keeping the feature information of the feature point unchanged, in response to determining that the distance from the respective feature point to the profile edge curve is not greater than the distance from a corresponding respective convergence feature point to the profile edge curve.

3. The method of claim 1, further comprising:
   determining whether a magnitude of overall position change of all the feature points of the human face edge in the human face image before and after the above determination is less than a preset threshold; and
   using position information of the group of feature points as qualified feature points of human face edge, in response to determining that the magnitude is less than the preset threshold.

4. The method of claim 3, further comprising:
   using a preset convergence algorithm to obtain feature information of a convergence feature point corresponding to each feature point according to the feature information of each feature point, in response to determining that the magnitude is not less than the preset threshold.

5. The method of claim 3, wherein the determining whether the magnitude of overall position change of all the feature points of the human face edge in the human face image before and after the above determination is less than the preset threshold includes:
   calculating, according to feature information of all the feature points of the human face edge in the human face image before and after the above determination, the magnitude of overall position change of all the feature points of the human face edge in the human face image before and after the above determination;
   determining whether the magnitude of the position change is less than the preset threshold; and
   determining that feature information of each feature point of the human face edge in the human face image is unchanged, in response to determining that the magnitude is less than the preset threshold.

6. The method of claim 5, further comprising returning to the calculating by using the preset convergence algorithm to obtain feature information of the convergence feature point corresponding to each feature point according to the feature information of each feature point, in response to determining that the magnitude is not less than the preset threshold.

7. The method of claim 5, wherein the calculating the magnitude of overall position change of all the feature points of the human face edge in the human face image before and after the above determination includes:
   acquiring a vector formed by connecting all feature points of the human face edge in the human face image before the above determination;
   acquiring a vector formed by connecting all feature points of the human face edge in the human face image after the above determination; and
   calculating a Euclidean distance between the vector formed by connecting all feature points of the human face edge in the human face image before the above determination and the vector formed by connecting all feature points of the human face edge in the human face image after the above determination to serve as the magnitude of overall position change of all the feature points of the human face edge in the human face image before and after the above determination.

8. The method of claim 1, wherein the preset convergence algorithm includes:

$$\Delta X_1 = R_0 * \phi_0 + b_0;\text{ and}$$

$$X_k = X_{k-1} + R_{k-1} * \phi_{k-1} + b_{k-1},$$

wherein:
$X_k$ is a vector formed by connecting convergence feature points obtained after calculation by using the convergence algorithm for the $k^{th}$ time, and $X_{k-1}$ is a vector formed by connecting convergence feature points obtained after calculation by using the convergence algorithm for the $(k-1)^{th}$ time;

$\Delta X_1$ is an offset value between a vector $X_1$ formed by connecting convergence feature points obtained after calculation by using the convergence algorithm for the first time and a vector $X_0$ formed by connecting the feature points of the human face edge in the human face image; $\phi_0$ is a vector formed by connecting gradient direction features of the feature points before calculation by using the convergence algorithm for the first time; and R0 and b0 are preset coefficients; and $R_{k-1}$ and $b_{k-1}$ are coefficients after calculation by using the convergence algorithm for the $(k-1)^{th}$ time, and $\phi_{k-1}$ is a vector formed by connecting gradient direction features of convergence feature points obtained after calculation by using the convergence algorithm for the $(k-1)^{th}$ time.

9. The method of claim 1, further comprising:
prior to fitting the profile edge curve of human face edge in the human face image according to the human face image,
acquiring the human face image of the human face;
separating skin color regions and non-skin color regions in the human face image by using a preset skin color model; and
filtering out the non-skin color regions in the human face image.

10. The method of claim 9, further comprising:
after acquiring the human face image of the human face, expanding or clipping the acquired human face image into a human face image having a set size or format.

11. The method of claim 8, wherein the preset skin color model includes a Gaussian mixture model.

12. The method of claim 1, wherein the fitting the profile edge curve of human face edge in the human face image according to the human face image includes:
detecting strong edge of the human face in the human face image; and
fitting the profile edge curve of human face edge in the human face image according to the detected strong edge of the human face in the human face image.

13. The method of claim 12, further comprising acquiring the strong edge of the human face in the human face image by detecting using a Canny edge detection operator.

14. The method of claim 12, wherein the fitting the profile edge curve of human face edge in the human face image includes:
filtering the detected strong edge of the human face in the human face image to obtain the profile curve of the human face in the human face image;
making at least one ray according to a preset angle by using at least one feature point corresponding to the five sense organs of the human face in the human face image as an endpoint of the ray in the human face image corresponding to the profile curve of the human face; and
acquiring an intersection of the ray and the profile curve of the human face in the human face image and fitting a third-order Bezier curve in the human face image corresponding to the profile curve of the human face to serve as the profile edge curve of the human face edge in the human face image.

15. The method of claim 1, wherein the calculating by using the preset human face edge feature point calculation model to obtain feature points of the human face edge in the human face image includes:
calculating by using the human face edge feature point calculation model in combination with pre-trained parameters to obtain position information of the respective feature point of the human face edge in the human face image;
acquiring a gradient direction feature of the respective feature point, acquired in the above calculating, in a region with the respective feature point itself as the center and having a set size or a set shape; and
using the position information and the gradient direction feature of the respective feature point as respective feature information of the respective feature point.

16. The method of claim 1, wherein the feature information includes position information.

17. An apparatus comprising:
one or more processors; and
one or more memories stored thereon computer executable units executable by the one or more processors, the computer executable units including:
a profile edge curve fitting unit that detects a strong edge of a human face in the human face image; and fits a profile edge curve of a human face edge in the human face image according to the detected strong edge of the human face image;
a feature information calculation unit that calculates by using a preset human face edge feature point calculation model to obtain feature points of the human face edge in the human face image, and acquires feature information of a respective feature point, the feature information including at least position information;
a convergence calculation unit that calculates by using a preset convergence algorithm to obtain feature information of a convergence feature point corresponding to the respective feature point according to the feature information of the respective feature point;
a convergence direction determination unit that:
determines whether a distance from the respective feature point to the profile edge curve is greater than a distance from a corresponding respective convergence feature point to the profile edge curve according to the feature information of the respective feature point and the respective convergence feature point; and
acquires the feature information of the respective convergence feature point corresponding to the feature point to serve as the feature information of the feature point, in response to determining that the distance from the respective feature point to the profile edge curve is greater than the distance from a corresponding respective convergence feature point to the profile edge curve, and
an output interface that outputs the feature points and the feature information of the respective feature point for determining a shape of the human face.

18. The apparatus of claim 17, wherein the computer executable units further comprise a feature information determination unit that uses position information of the group of feature points as qualified feature points of human face edge.

19. The apparatus of claim 17, wherein the convergence direction determination unit keeps the feature information of the feature point unchanged, in response to determining that the distance from the respective feature point to the profile edge curve is not greater than the distance from a corresponding respective convergence feature point to the profile edge curve.

20. One or more memories stored thereon computer-executable instructions, executable by one or more processors, to cause the one or more processors to perform acts comprising:
  fitting a profile edge curve of a human face edge in a human face image according to the human face image;
  determining feature points of the human face edge in the human face image by using a preset human face edge feature point calculation model;
  acquiring feature information of a respective feature point;
  determining feature information of a convergence feature point corresponding to the respective feature point according to the feature information of the respective feature point;
  determining whether a distance from the respective feature point to the profile edge curve is greater than a distance from a corresponding respective convergence feature point to the profile edge curve according to the feature information of the respective feature point and the respective convergence feature point;
  acquiring the feature information of the respective convergence feature point corresponding to the feature point to serve as the feature information of the feature point, in response to determining that the distance from the respective feature point to the profile edge curve is greater than the distance from a corresponding respective convergence feature point to the profile edge curve; and
  outputting the feature points and the feature information of the respective feature point through an output interface for determining a shape of the human face.

\* \* \* \* \*